F. H. CLEMENT, DEC'D.
L. S., M. G. AND B. H. CLEMENT, EXECUTORS.
LUBRICATOR FOR BALL BEARINGS.
APPLICATION FILED DEC. 28, 1918.
1,378,658.
Patented May 17, 1921.
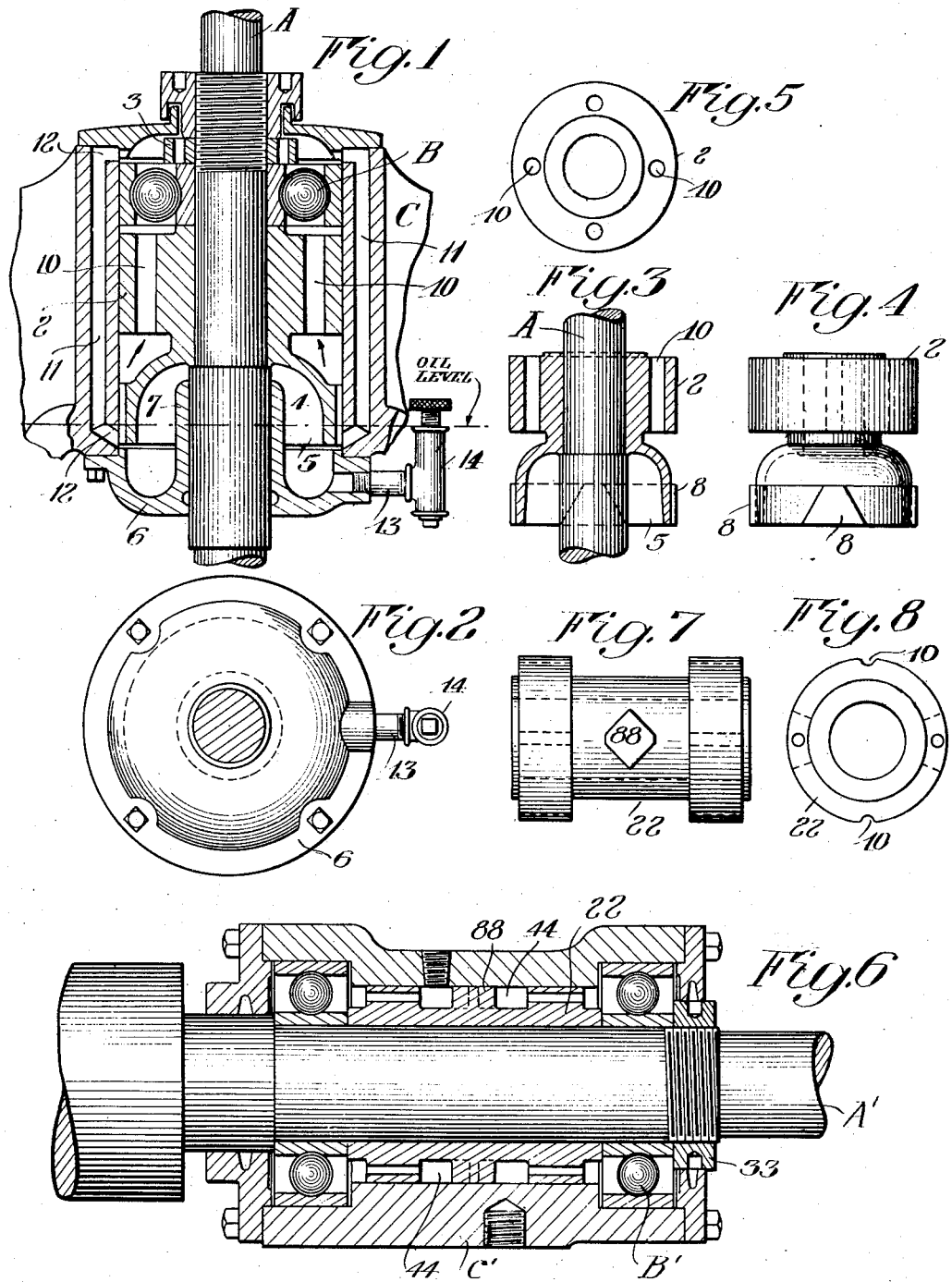
INVENTOR
Frank H. Clement
BY
his ATTORNEY

UNITED STATES PATENT OFFICE.

FRANK H. CLEMENT, OF ROCHESTER, NEW YORK; LOUISA S. CLEMENT, MARY G. CLEMENT, AND BENJ. H. CLEMENT, EXECUTORS OF SAID FRANK H. CLEMENT, DECEASED, ASSIGNORS TO AMERICAN WOODWORKING MACHINERY COMPANY, OF ROCHESTER, NEW YORK, A CORPORATION OF PENNSYLVANIA.

LUBRICATOR FOR BALL-BEARINGS.

1,378,658.     Specification of Letters Patent.     Patented May 17, 1921.

Application filed December 28, 1918. Serial No. 268,736.

*To all whom it may concern:*

Be it known that I, FRANK H. CLEMENT, a citizen of the United States, residing at Rochester, county of Monroe, State of New York, have invented new and useful Improvements in Lubricators for Ball-Bearings, of which the following is a specification.

This invention relates to ball bearings and it has for its object to provide for the positive application of oil to ball bearings either on a vertical or a horizontal spindle, and, as far as possible, the establishing of a circulation of oil from a chamber adapted to receive and deliver the oil as needed. My preferred embodiment of the invention contemplates the provision of a sleeve revolving with the spindle in an oil reservoir, said sleeve having provision on its periphery for forcing the oil out of the containing chamber toward or through the ball or other similar bearing; and the invention consists further in certain improvements and combinations of parts, all as will be hereinafter more fully described, the novel features being pointed out in the claims at the end of the specification.

In the accompanying drawings, Figure 1 is a longitudinal section of my invention as embodied in a vertical spindle having ball bearings; Fig. 2 is a plan view of the bottom of the bearing housing; Fig. 3 is a vertical central section of the revolving oiling sleeve; Fig. 4 is an elevation of the same; Fig. 5 is a plan view of the sleeve; Fig. 6 is a central section showing the application of my invention to a horizontal spindle. Figs. 7 and 8 are side and end elevations of the horizontal oiling sleeve.

A, Figs. 1 and 3, is a revoluble spindle upon which is mounted in a suitable manner the ball or other similar bearing B. The outer race of this bearing is fitted to the bore of the supporting housing or yoke C. A sleeve 2 is fitted against a shoulder on the spindle A and the inner ball race rests against its upper face and is clamped rigidly to the spindle by the nut 3, Fig. 1; thus the sleeve 2 always revolves with the spindle.

A similar description applies to the horizontal shaft A', Fig. 6, except that in this case there are two ball bearings with a sleeve 22 between them; a nut or threaded collar 33 clamps the inner ball races rigidly to the shaft A and the whole is contained in the housing or box C'.

In the practice of my present invention, I extend the sleeve 2, Figs. 1 and 3, downward into a space 4, under the ball bearing which is partly filled with oil and a cover 6 is fitted to the lower face of the housing C, said cover being provided with an upwardly projecting annular flange 7 through which the spindle A passes, revolving freely therein. This flange 7 prevents the oil from leaking out of the chamber 4 around the spindle A so long as the oil level is below the top of the annular flange 7. The sleeve 2 is fitted on its periphery to revolve without contact in the bore of the chamber 4, but by means of the oil film which is necessarily present when the chamber is properly filled, the sleeve acts as a steady bearing to prevent vibration when the spindle is revolving at a high speed.

The lower part 5 of sleeve 2 extends downward in cup shape over the annular flange 7 and carries on its periphery two or more projecting lugs 8, the outer peripheries of which fit loosely in the bore of the housing C; the sides of the lugs 8 lie at an angle to the axis of the spindle A, as indicated in Fig. 4. This angle may be varied considerably and must be proportioned to the velocity of revolution. It will be seen that when the chamber 4 is supplied with oil and the spindle A and sleeve 2 are put in motion, the oil will be lifted in the chamber by the action of the angled sides of the lugs 8 and forced by centrifugal action against the inner periphery of the chamber. In order to convey the current of oil thus lifted, directly to the ball bearing, I provide openings 10 through the main body of the sleeve 2, approximately under the balls and the latter are thus constantly lubricated; furthermore the oil which passes through the ball bearings is kept in constant circulation by means of channels 11 which are provided in the housing C, into which the oil flows at the top of the housing and returns to the chamber 4 by means of side channels as at 12, Fig. 1.

I have found also as a matter of factory experience that only a slight film of oil is required on the balls, and if a large volume of oil is forced through the ball races, heat is rapidly generated especially at the high speeds required on many spindles such as are used in woodworking machinery. To regulate this, the angle of the sides of the lugs 8 must be adapted to the speed as previously mentioned, and the supply of oil limited; and for this latter purpose I provide an oil tube 13, preferably in the cover 6, communicating with the chamber 4 and having an elbow extension 14, which is closed by a plug or cap. The upper edge of this elbow fixes the oil level at a point where the lugs 8 take up oil and force it upward as above described, and all that is required is that the operator keep the tube 13 and its elbow full of oil or nearly so.

Instead of the channels 10 being located in the body of the sleeve 2 as shown, they would no doubt work equally well if placed in the periphery of the sleeve as indicated in the horizontal sleeve 22, Fig. 8.

Referring now to Fig. 6 showing the application of my invention to a horizontal spindle, it will be seen that the lugs 88 on the sleeve 22, being angled on opposite sides, act to agitate and force the oil lying in the chamber 44 in both directions through the ball races, so that the oil is held banked against the balls as long as there is any in the chamber 44 to be constantly operated on by the lugs 88, which are beveled on both edges as described. When the spindle comes to rest, the oil drains back into the chamber 44.

An important advantage in the operation of this device is the steadying effect of the sleeve 2 which while fitting loosely in the chamber 4 really takes a bearing upon its inner periphery by means of the film of oil which is constantly supplied by the centrifugal action of the lugs 8, thus supplementing and relieving the tendency to side vibration of the spindle when running at a high velocity.

What I claim as my invention and desire to secure by Letters Patent is:

1. The combination with a ball bearing housing and a revoluble spindle therein carrying a ball bearing, of a sleeve secured to said spindle concentrically therewith and closely fitting the housing lugs on the periphery of the sleeve projecting into a body of oil contained in said housing, and having their sides angled with reference to the axis of the spindle, whereby the oil is forced outward and upward to the ball races and a by-pass in the housing for the return of the oil.

2. The combination with a ball bearing housing and a revoluble spindle therein, of a concentric sleeve attached thereto, lugs on the periphery of the sleeve the sides of which are angled with reference to the axis of the spindle, said sleeve being fitted loosely in the bore of the housing, whereby the sleeve acts as a steady bearing by means of the film of oil resultant from the centrifugal action of said sleeve and lugs in the oil chamber.

3. The combination with a ball bearing housing and a revoluble spindle therein, of a sleeve secured to the spindle concentrically therewith having means on its periphery to force a circulation of oil, an oiling tube communicating with the oil chamber and provided with an upturned entrance for oil, so located that a working oil level may always be obtained but not exceeded.

4. In a ball bearing housing, a vertical revoluble spindle, a concentric collar or sleeve carrying oil lifting and agitating lugs on its periphery, an oil chamber receiving said collar and lugs, means for introducing oil to said chamber and a by-pass for returning it to the chamber after its application to the bearing.

5. The combination with a ball bearing housing having a ball race and an oil chamber, and a revoluble spindle therein, of a sleeve on the spindle having an oil passage leading to the ball race and provided with a device for forcing oil therethrough and a by-pass in the housing for returning the oil to the chamber.

6. The combination with a ball bearing housing having a ball race and an oil chamber and provided with a return passage leading from the former to the latter, of a sleeve on the spindle having an oil passage leading to the ball race and provided with a device for forcing oil therethrough, the said sleeve being loosely fitted to the housing to provide a steadying bearing for the spindle through the medium of an intervening oil film.

7. The combination with a ball bearing housing having a ball race and an oil chamber and a revoluble spindle therein, of a sleeve on the spindle having a passage therein leading from the chamber to the ball race and provided with devices for forcing oil in the chamber into said passages.

FRANK H. CLEMENT.

Witnesses:
RAYMOND W. BOSWORTH,
HARALD C. KIMBER.